United States Patent
Kim et al.

(10) Patent No.: US 10,604,052 B2
(45) Date of Patent: Mar. 31, 2020

(54) SLIDING-TYPE FOOTREST DEVICE FOR VEHICLE

(71) Applicants: HYUNDAI MOTOR COMPANY, Seoul (KR); KIA MOTORS CORPORATION, Seoul (KR); HYUNDAI DYMOS INCORPORATED, Seosan-si, Chungcheongnam-do (KR)

(72) Inventors: Eun Sue Kim, Ansan-si (KR); Dae Ig Jung, Suwon-si (KR); Jai Hak Kim, Gunpo-si (KR); Seung Hyeok Chang, Suwon-si (KR); Byoung Wan Bae, Hwaseong-si (KR); Seong Bin Jeong, Yongin-si (KR); Sin Jeong Kang, Hwaseong-si (KR); Duk Kyu Byun, Gunpo-si (KR)

(73) Assignees: Hyundai Motor Company, Seoul (KR); Kia Motors Corporation, Seoul (KR); Hyundai Dymos Incorporated, Seosan-si, Chungcheongnam-do (KR)

( * ) Notice: Subject to any disclaimer, the term of this patent is extended or adjusted under 35 U.S.C. 154(b) by 142 days.

(21) Appl. No.: 15/979,728

(22) Filed: May 15, 2018

(65) Prior Publication Data

US 2019/0232847 A1 Aug. 1, 2019

(30) Foreign Application Priority Data

Jan. 29, 2018 (KR) ........................ 10-2018-0010748

(51) Int. Cl.
*B60N 3/06* (2006.01)
*B60R 7/04* (2006.01)
*B60N 99/00* (2006.01)

(52) U.S. Cl.
CPC ............. *B60N 3/063* (2013.01); *B60N 99/00* (2013.01); *B60R 7/04* (2013.01)

(58) Field of Classification Search
CPC ........ A47C 1/0355; A61G 5/12; A61G 5/128; A61G 5/14; A61G 5/10; G07F 17/32; G07F 17/3216; A47K 3/281
USPC .......................................................... 296/75
See application file for complete search history.

(56) References Cited

U.S. PATENT DOCUMENTS

| 2,104,830 | A | * | 1/1938 | Collard | ................ | A61G 15/005 |
| | | | | | | 297/22 |
| 2,950,753 | A | * | 8/1960 | Gleitsman | ............ | A47C 16/025 |
| | | | | | | 297/188.01 |
| 3,130,968 | A | * | 4/1964 | De Feen | ................ | A63B 23/00 |
| | | | | | | 297/344.13 |

(Continued)

FOREIGN PATENT DOCUMENTS

KR 10-2006-0007915 A 1/2006

*Primary Examiner* — Kiran B Patel
(74) *Attorney, Agent, or Firm* — Morgan, Lewis & Bockius LLP

(57) ABSTRACT

A sliding-type footrest device for a vehicle includes: a guide rail mounted on a floor panel and extending in a forward-and-backward direction; a footrest housing engaged with the guide rail to slide along the guide rail in the forward-and-backward direction, the footrest housing having a door configured to be opened or closed; and a footrest box disposed inside the footrest housing and allowing a backseat passenger to place feet into the footrest while the door is open.

11 Claims, 5 Drawing Sheets

(56) References Cited

U.S. PATENT DOCUMENTS

| | | | | |
|---|---|---|---|---|
| 3,400,975 A | * | 9/1968 | Rogers, Jr. | A47C 1/0355 297/259.2 |
| 3,433,527 A | * | 3/1969 | Re | A47C 1/0355 297/83 |
| RE27,231 E | * | 11/1971 | Fletcher | A47C 1/0355 297/259.2 |
| 3,637,255 A | * | 1/1972 | Re | A47C 1/0345 297/259.2 |
| 3,638,995 A | * | 2/1972 | Flanagan | A47C 1/0355 297/317 |
| 3,707,284 A | * | 12/1972 | Waldeck | A61H 15/00 482/123 |
| 3,730,585 A | * | 5/1973 | Rogers, Jr. | A47C 3/025 297/259.2 |
| 3,826,532 A | * | 7/1974 | Caldemeyer | A47C 3/025 297/269.1 |
| 3,869,169 A | * | 3/1975 | Johnson | A47C 7/506 297/423.2 |
| 3,869,170 A | * | 3/1975 | James | A47C 3/03 297/269.1 |
| 3,936,893 A | * | 2/1976 | Anderson | A61G 5/006 5/86.1 |
| 4,046,419 A | * | 9/1977 | Schmitt | A47C 1/024 248/429 |
| 4,072,342 A | * | 2/1978 | Johnson | A47C 1/0347 297/318 |
| 4,216,991 A | * | 8/1980 | Holobaugh | A47C 1/0352 297/322 |
| 4,216,992 A | * | 8/1980 | Crum | A47C 1/0352 297/344.15 |
| 4,244,620 A | * | 1/1981 | Harrison | A47C 1/0352 297/342 |
| 4,346,933 A | * | 8/1982 | Jacobs | A47C 1/0345 297/329 |
| 4,572,500 A | * | 2/1986 | Weiss | A63B 22/0076 482/112 |
| 4,601,513 A | * | 7/1986 | Pine | A47C 1/0355 297/269.1 |
| 4,796,881 A | * | 1/1989 | Watterson | A63B 21/023 482/130 |
| 4,805,960 A | * | 2/1989 | Tacker | A47C 1/0355 297/85 L |
| 4,921,242 A | * | 5/1990 | Watterson | A63B 21/0083 482/121 |
| 5,076,644 A | * | 12/1991 | Northcutt | A47C 1/0345 297/330 |
| 5,129,701 A | * | 7/1992 | Pine | A47C 1/0355 297/68 |
| 5,156,441 A | * | 10/1992 | Byersmith | A47C 1/0352 297/423.28 |
| 5,255,934 A | * | 10/1993 | Wilson | A61G 5/045 180/907 |
| 5,260,870 A | * | 11/1993 | Tsuchiya | A61B 5/224 482/1 |
| 5,282,279 A | * | 2/1994 | Hinton | A47K 17/028 297/423.14 |
| 5,346,277 A | * | 9/1994 | Holobaugh | A47C 1/037 297/396 |
| 5,346,280 A | * | 9/1994 | Deumite | A61G 5/14 180/907 |
| 5,367,976 A | * | 11/1994 | Van Schaik | B63H 16/02 114/153 |
| 5,374,102 A | * | 12/1994 | Archambault | B60N 2/062 297/301.6 |
| 5,388,886 A | * | 2/1995 | LaPointe | A47C 1/0345 297/75 |
| 5,409,296 A | * | 4/1995 | Barile | A47C 9/022 248/172 |
| 5,466,041 A | * | 11/1995 | Hoffman | A47C 7/62 297/188.1 |
| 5,478,133 A | * | 12/1995 | Tidwell, Jr. | A47C 1/0355 297/440.1 |
| 5,690,594 A | * | 11/1997 | Mankovitz | A63B 23/03516 482/121 |
| 5,701,965 A | * | 12/1997 | Kamen | A61G 5/04 180/7.1 |
| 5,971,091 A | * | 10/1999 | Kamen | A61G 5/04 180/218 |
| 6,145,931 A | * | 11/2000 | Subotic | A47C 7/506 297/188.11 |
| 7,128,700 B2 | * | 10/2006 | Wallach | A63B 21/0552 482/130 |
| 7,552,695 B1 | * | 6/2009 | Matsueda | B63H 16/02 114/363 |
| 8,851,563 B2 | * | 10/2014 | Hortig | A47C 1/035 248/370 |
| 8,882,190 B2 | * | 11/2014 | Garland | A47C 7/506 297/85 L |
| 9,216,679 B1 | * | 12/2015 | Wong | B60N 3/063 |
| 10,045,625 B2 | * | 8/2018 | Johnson | A47C 7/506 |
| 2008/0143137 A1 | * | 6/2008 | Bowen | B60N 2/0232 296/75 |
| 2009/0205556 A1 | * | 8/2009 | Kawahara | B63H 16/02 114/363 |
| 2010/0018450 A1 | * | 1/2010 | Matsueda | B63H 16/02 114/363 |
| 2010/0301640 A1 | * | 12/2010 | Heiser | A47C 1/06 297/135 |
| 2013/0038107 A1 | * | 2/2013 | Tamura | B60N 2/0232 297/331 |
| 2016/0176322 A1 | * | 6/2016 | Frommann | B60N 2/42709 701/45 |
| 2016/0288684 A1 | * | 10/2016 | Christiansson | B60N 3/001 |
| 2017/0283059 A1 | * | 10/2017 | McKee | B64D 11/003 |
| 2017/0368964 A1 | * | 12/2017 | Kim | B60N 2/0232 |
| 2019/0135136 A1 | * | 5/2019 | Akaike | B60N 2/01 |

* cited by examiner

SLIDING-TYPE FOOTREST DEVICE FOR VEHICLE

CROSS-REFERENCE TO RELATED APPLICATION

This application claims the benefit of priority to Korean Patent Application No. 10-2018-0010748, filed on Jan. 29, 2018 in the Korean Intellectual Property Office, the disclosure of which is incorporated herein by reference.

TECHNICAL FIELD

The present disclosure relates to a sliding-type footrest device for a vehicle, into which a backseat passenger is capable of placing the feet and which is capable of performing a heating function, a ventilation function, and a massage function.

BACKGROUND

An autonomous vehicle is a kind of smart vehicle, which travels autonomously, specifically, which is capable of autonomously travelling to a set destination by itself without manipulation of the steering wheel, the accelerator, the brake, or the like by a driver. These days, development of such an autonomous vehicle is being accelerated.

When such an autonomous vehicle is commercialized, passengers may want to take a rest as comfortably as possible. For example, a backseat passenger may want to take a rest while stretching out his/her legs.

A conventional footrest for a vehicle is formed in a plate configuration, which merely supports the feet of a backseat passenger when the passenger puts his/her feet thereon. This footrest is rotatably mounted to a rear portion of the driver's seat or the front passenger seat. However, this conventional footrest is unsuitable for use in an autonomous vehicle in terms of maximum utilization of the space.

The information disclosed in this Background of the Invention section is only for enhancement of understanding of the general background of the invention and should not be taken as an acknowledgement or any form of suggestion that this information forms the prior art already known to a person skilled in the art.

SUMMARY

The present disclosure has been made in view of the above problems, and it is an object of the present disclosure to provide a sliding-type footrest device for a vehicle, which is mounted in a space provided beside the driver's seat so as to slide in the forward-and-backward direction, whereby a backseat passenger uses the footrest device by placing the feet thereinto and the footrest device slides forwards and is located in a space under the dashboard when unused, thereby maximizing the utilization of an interior space of the vehicle.

It is another object of the present disclosure to provide a sliding-type footrest device for a vehicle, which is capable of performing a heating function, a ventilation function and a massage function.

In accordance with an exemplary embodiment of the present disclosure, a sliding-type footrest device for a vehicle includes: a guide rail mounted on a floor panel and extending in the forward-and-backward direction; a footrest housing engaged with the guide rail and sliding along the guide rail in the forward-and-backward direction; the footrest housing having a door configured to be opened or closed; and a footrest box disposed inside the footrest housing and configured to allow a backseat passenger to place feet into the footrest box while the door is open.

The guide rail may extend to a space under a portion of a dashboard in which a glove compartment is provided, and, when the footrest housing slides and reaches the foremost position, the footrest housing may be located in the space under the dashboard and may be prevented from being exposed to the interior space of the vehicle.

The door may be a single door provided at the rear end portion of the footrest housing and configured to slide vertically so as to open the footrest box.

The door may include a first door for opening or closing the rear end portion of the footrest housing and a second door for opening or closing the rear-upper portion of the footrest housing, wherein the front end of the second door may be rotatably coupled to the upper portion of the footrest housing, and the rear end of the second door and the front end of the first door may be connected to each other so as to rotate relative to each other. When the rear end of the second door rotates upwards, the first door and the second door may be opened by overlapping each other.

Alternatively, the door may include a first door for opening or closing the rear end portion of the footrest housing and a second door for opening or closing the rear-upper portion of the footrest housing, wherein the first door may be rotatably coupled at the lower end thereof to the rear-lower end of the footrest housing so as to be opened in a manner such that the upper end thereof rotates backwards, and the second door is rotatably coupled at the front end thereof to the upper portion of the footrest housing so as to be opened in a manner such that the rear end thereof rotates upwards.

The footrest box may include a foot plate configured to allow a backseat passenger to place the feet thereon, a foot-plate cover for covering the foot plate, and an elastic band provided around the foot plate and the foot-plate cover to bind the foot plate and the foot-plate cover to each other. The foot-plate cover may have an open rear portion.

The foot plate may be provided with a heating wire for performing a heating function.

Alternatively, the foot plate may be provided with a heating wire for performing a heating function and a plurality of air pockets for performing a massage function.

Alternatively, the foot plate may be provided with a heating wire for performing a heating function and a plurality of air pockets for performing a massage function, and the foot-plate cover may be connected with a blower via a duct for performing a ventilation function.

The front end of the foot plate and the front end of the foot-plate cover may be coupled to each other via a hinge shaft so as to rotate relative to each other, the rear end of the foot plate and the rear end of the foot-plate cover may be rotatable so as to move away from each other about the hinge shaft, and the elastic band may provide elastic force so that the rear end of the foot plate and the rear end of the foot-plate cover move toward each other.

The footrest housing may be provided with a storage container configured to slide vertically along side rails, the storage container may slide vertically while the second door is open, and when the storage container slides upwards, a space formed between the storage container and the footrest housing may serve as the footrest box.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Figure 1:
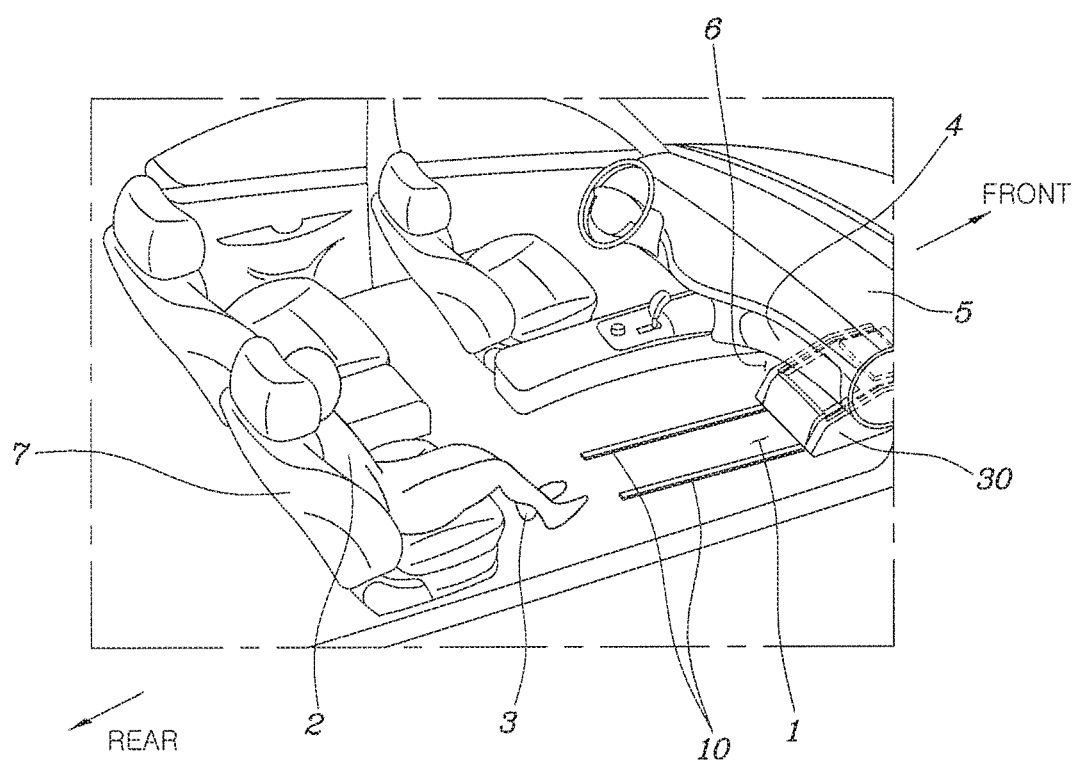
FIG. 1 is a view illustrating the state in which a sliding-type footrest device according to an exemplary embodiment of the present disclosure slides to the foremost position and is located in a space under a dashboard.
Figure 2:
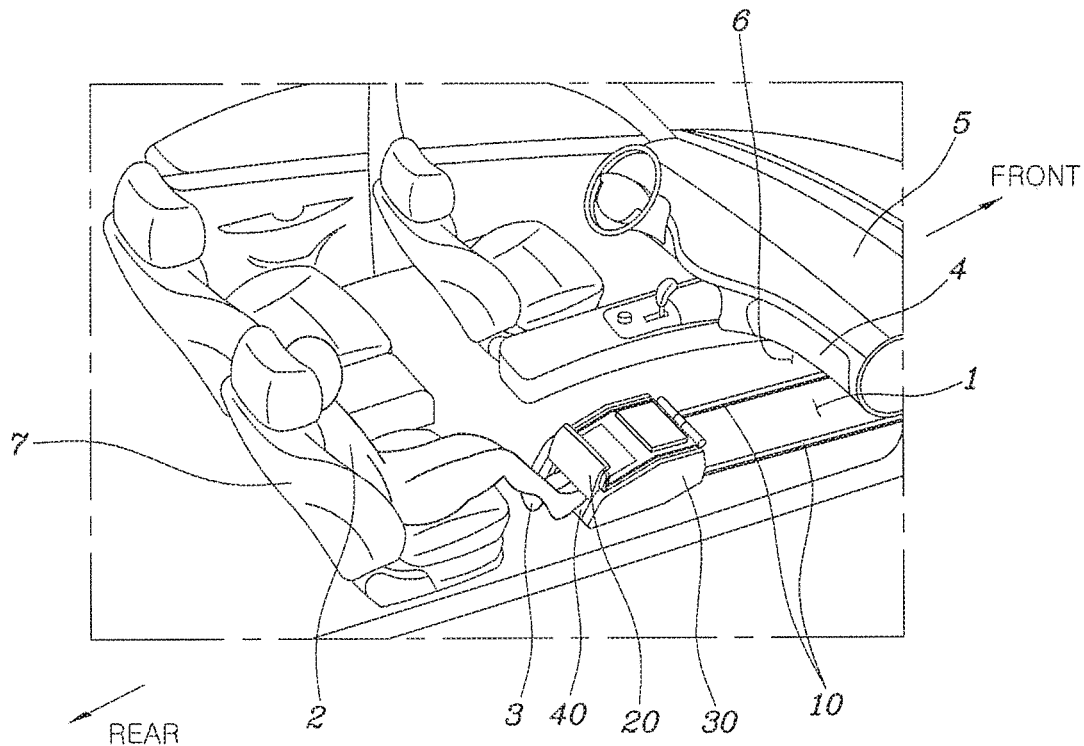
FIG. 2 is a view illustrating a state in which the sliding-type footrest device according to the present disclosure is withdrawn backwards.

Reference will now be made in detail to exemplary embodiments of the present disclosure, examples of which are illustrated in the accompanying drawings. Wherever possible, the same reference numbers will be used throughout the drawings to refer to the same or like parts.

A sliding-type footrest device for a vehicle according to the present disclosure, as shown in FIGS. 1 to 8, includes: a guide rail 10, which is mounted on a floor panel 1, which is provided beside the driver's seat, so as to extend in a forward-and-backward direction; a footrest housing 30, which is engaged with the guide rail 10 so as to slide along the guide rail 10 in the forward-and-backward direction and which is provided with a door 20 configured to be opened or closed; and a footrest box 40, which is disposed inside the footrest housing 30 and which is configured such that a passenger 2 in a backseat 7 places the feet 3 thereinto while the door 20 is open.

The guide rail 10 extends such that the front end thereof is located in a space 6 under a portion of a dashboard 5 in which a glove compartment 4 is provided and such that the rear end thereof is located in front of the backseat 7. Therefore, when the footrest housing 30 slides and reaches the foremost position, the footrest housing 30 is located in the space 6 under the dashboard 5, and is not exposed to the interior space of the vehicle. Through this configuration, the interior space of the vehicle may be maximally utilized, and accordingly, the footrest device according to the present disclosure is applicable to autonomous vehicles.

Further, when the footrest housing 30 moves backwards, the backseat passenger 2 may open the door 20, and may place the feet 3 into the footrest box 40 provided inside the footrest housing 30.

The sliding movement of the footrest housing 30 along the guide rail 10 in the forward-and-backward direction may be realized either by an electric mechanism using the power of a motor or by a mechanical mechanism using the manipulation of a user.

Further, in the case of an electric mechanism, the passenger may control the operation of the footrest housing using an application installed in his/her smartphone, tablet PC, or the like.

Figure 3:
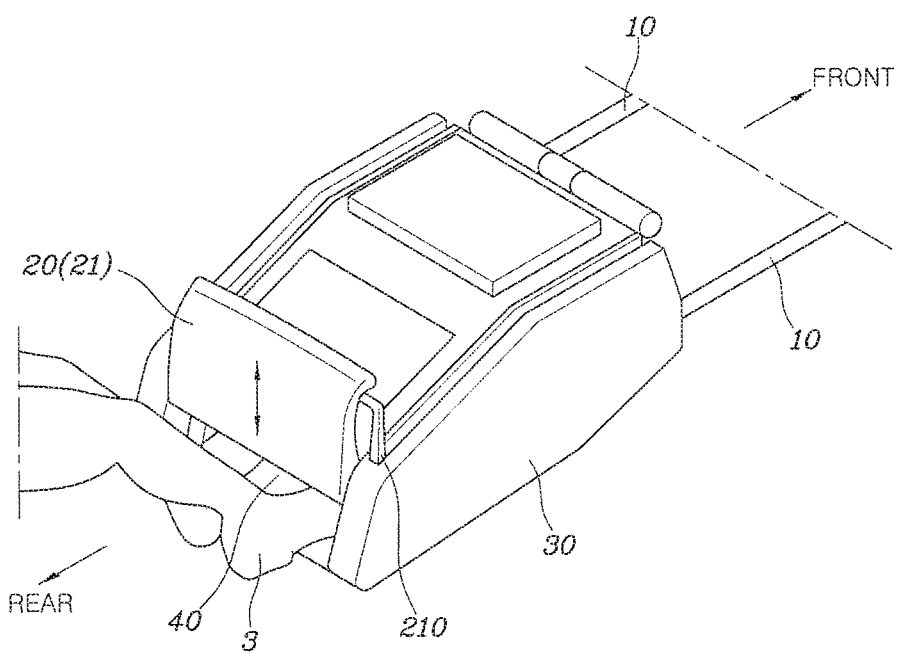
FIGS. 3 to 6 are views for explaining various embodiments of a door provided at a footrest housing.

As shown in FIG. 3, the door 20 may be embodied by a single door 21, which is provided at the rear end portion of the footrest housing 30 and is configured to slide vertically so as to open or close the footrest box 40.

The single door 21 is coupled to a door bar 210. Both ends of the door bar 210 are bent and extend vertically. The door bar 210 may be configured to serve as a worm, which is engaged with a worm wheel. The worm wheel may be connected with the motor. When the motor operates, the door bar 210, which serves as a worm, slides vertically with respect to the footrest housing 30, thereby opening or closing the footrest box 40 provided inside the footrest housing 30.

Alternatively, the single door 21 may be configured to rotate vertically with respect to the door bar 210. In this case, the backseat passenger 2 may more easily place the feet 3 into the footrest box 40 via the rotation of the single door 21.

Figure 4:
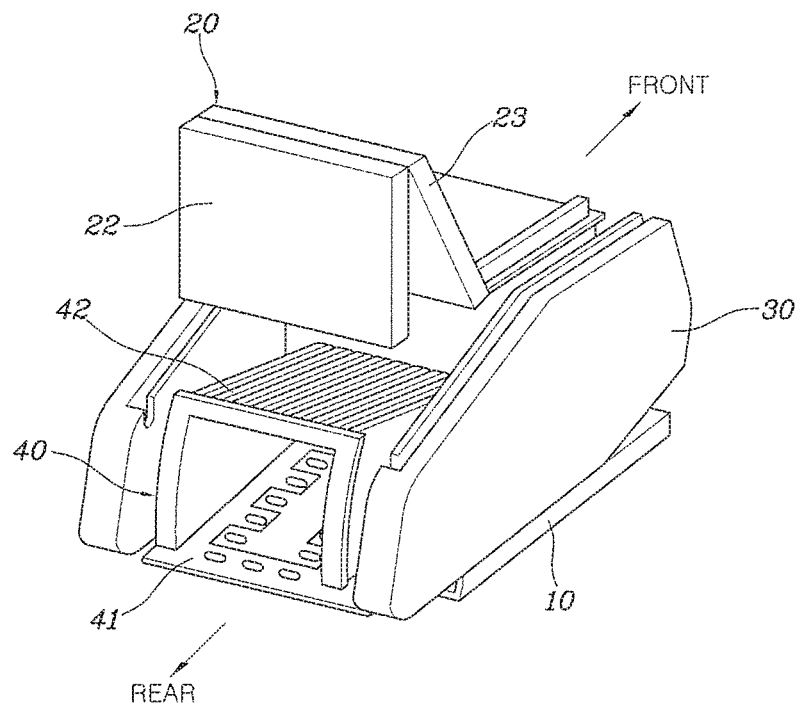

FIG. 4 illustrates another embodiment of the door 20. The door 20 of the other embodiment includes a first door 22, which opens or closes the rear end portion of the footrest housing 30, and a second door 23, which opens or closes the rear-upper portion of the footrest housing 30. The front end of the second door 23 is rotatably coupled to the upper portion of the footrest housing 30, and the rear end of the second door 23 and the front end of the first door 22 are connected to each other via a coupling member such as a hinge so as to rotate relative to each other. Therefore, when the rear end of the second door 23 rotates upwards, the first door 22 and the second door 23 overlap each other, and consequently open the footrest housing 30.

The door 20 illustrated in FIG. 4 has a configuration capable of securing a larger size of the entrance, through which the backseat passenger 2 places the feet 3 into the footrest box 40. Therefore, compared to the single door 21 illustrated in FIG. 3, the door 20 in FIG. 4 enables the backseat passenger 2 to more easily place the feet 3 into the footrest box 40.

The door 20 in FIG. 4 may be configured such that the first door 22 and the second door 23 are operated simultaneously by a single motor. That is, when the second door 23 is operated by the power of the motor, the operation of the first door 22 is interlocked with the operation of the second door 23.

To this end, the front end of the second door 23 is rotatably coupled to the upper portion of the footrest housing 30 via a hinge shaft.

Figure 5:
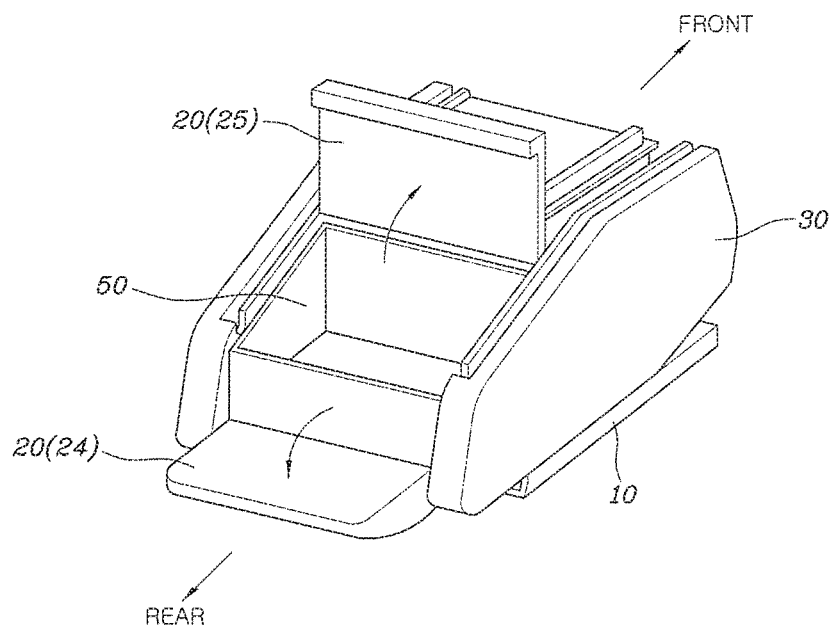

FIG. 5 illustrates a further embodiment of the door 20. The door 20 illustrated in FIG. 5 includes a first door 24, which opens or closes the rear end portion of the footrest housing 30, and a second door 25, which opens or closes the rear-upper portion of the footrest housing 30. The first door 24 is rotatably coupled at the lower end thereof to the rear-lower end of the footrest housing 30, whereby the upper end of the first door 24 rotates backwards, and consequently, opens the rear end portion of the footrest housing 30. The second door 25 is rotatably coupled at the front end thereof to the upper portion of the footrest housing 30, whereby the rear end of the second door 25 rotates upwards, and consequently, opens the rear-upper portion of the footrest housing 30.

As shown in FIG. 5, the lower end of the first door 24 is rotatably coupled to the rear-lower end of the footrest housing 30 via a hinge shaft, and the front end of the second door 25 is rotatably coupled to the upper portion of the footrest housing 30 via a hinge shaft.

A motor for operating the first door 24 and a motor for operating the second door 25 are separately provided. Compared to the single door 21 illustrated in FIG. 3, the door 20 in FIG. 5 is capable of securing a larger size of the entrance, through which the backseat passenger 2 places the feet 3 into the footrest box 40, thereby enabling the backseat passenger 2 to more easily place the feet 3 into the footrest box 40. Further, compared to the door 20 illustrated in FIG. 4, the door 20 in FIG. 5 is configured such that the first door 24 and the second door 25 independently perform the opening/closing operation. Therefore, the opening/closing operation is performed more rapidly.

In the case in which the first and second doors 24 and 25 illustrated in FIG. 5 are applied to the footrest housing 30, a storage container 50, in which small items can be stored, may be provided inside the footrest housing 30.

Figure 6:
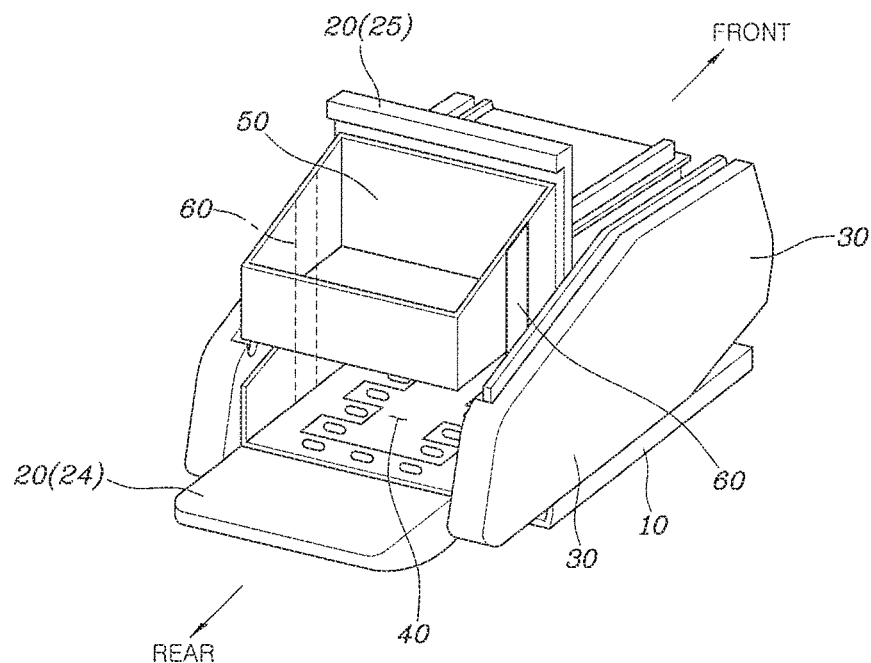

The storage container 50 is configured as a box having an open upper portion. When the second door 25 is opened, the storage container 50 is exposed to the outside. As shown in FIG. 6, the storage container 50 includes side rails 60, each of which is provided at a respective one of both side surfaces of the storage container 50 so as to extend vertically, whereby the storage container 50 is capable of moving vertically along the side rails 60.

It is desirable that the vertical movement of the storage container 50 be performed by an electric mechanism using a motor. If the storage container 50 is linked to the second door 25 such that the vertical movement of the storage container 50 is interlocked with the opening/closing operation of the second door 25, the vertical movement of the storage container 50 may be performed more efficiently.

In the embodiment illustrated in FIG. 6, when the second door 25 is opened and the storage container 50 slides upwards along the side rails 60, the space formed between the storage container 50 and the inner bottom surface of the footrest housing 30 may serve as the footrest box 40 included in the previous embodiments. In this case, since a separate footrest box is not needed, the weight and manufacturing costs of the footrest device according to the present disclosure may be reduced.

Figure 7:
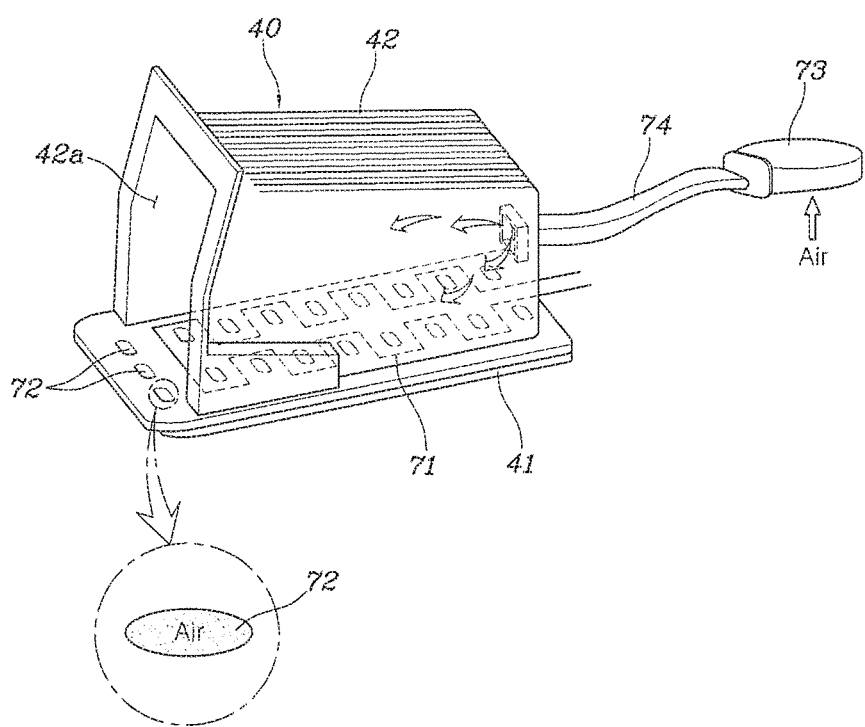
FIGS. 7 and 8 are, respectively, a perspective view and a side view for explaining a footrest box according to the present disclosure.
Figure 8:
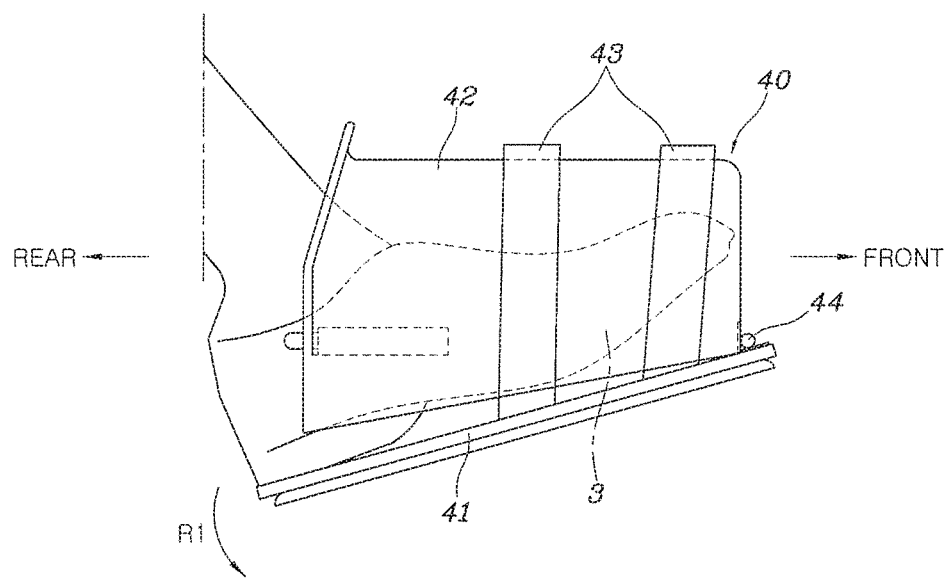

The footrest box 40 according to the present disclosure, as shown in FIGS. 7 and 8, includes a foot plate 41, on which the backseat passenger places the feet, a foot-plate cover 42, which covers the foot plate 41, and a plurality of elastic bands 43, which are provided around the foot plate 41 and the foot-plate cover 42 to bind the foot plate 41 and the foot-plate cover 42 to each other.

The front end of the foot plate 41 and the front end of the foot-plate cover 42 are coupled to each other via a hinge shaft 44 so as to rotate relative to each other, and accordingly, the rear end of the foot plate 41 and the rear end of the foot-plate cover 42 may rotate away from each other about the hinge shaft 44. The aforementioned elastic bands 43 provide elastic force so that the rear end of the foot plate 41 and the rear end of the foot-plate cover 42 may move toward each other.

Therefore, the backseat passenger 2 is capable of placing the feet 3 into the foot-plate cover 42 through a rear opening 42a in the foot-plate cover 42. Further, the passenger may rotate the rear end of the foot plate 41 downwards in the direction of arrow R1 in FIG. 8 using the heels of the feet 3 according to his/her posture. Therefore, the passenger is capable of placing the feet on the foot plate 41 more comfortably.

The foot plate 41 according to the embodiment of the present disclosure has a heating wire 71 for performing a heating function and a plurality of air pockets 72 for performing a massage function. In addition, a blower 73 is connected to the foot-plate cover 42 via a duct 74 so as to perform a ventilation function.

The supply of current to the heating wire 71, the supply and discharge of air to/from the air pockets 72, and the operation of the blower 73 may be controlled by a controller.

As a result, while the feet 3 of the backseat passenger 2 are placed in the foot-plate cover 42 and the soles of the feet 3 are in contact with the foot plate 41, the heating function, the massage function and the ventilation function may be independently performed, or at least two of these functions may be simultaneously performed by controlling the operation of the heating wire 71, the operation of the air pockets 72, and the operation of the blower 73. Consequently, the backseat passenger 2 is capable of taking a rest more comfortably.

As is apparent from the above description, according to the present disclosure, the sliding-type footrest device for a backseat passenger is mounted in a space provided beside the driver's seat so as to slide in the forward-and-backward direction. In addition, when unused, the footrest device slides forwards, and is located in the space 6 under a portion of the dashboard 5 in which the glove compartment 4 is provided. Therefore, the interior space of the vehicle may be maximally utilized, and the footrest device according to the present disclosure is applicable to autonomous vehicles.

In addition, since the heating wire 71, the air pockets 72, the blower 73, and the duct 74 are installed to the footrest box 40, into which the backseat passenger 2 places the feet 3, the backseat passenger 2 is capable of selectively realizing the heating function, the massage function and the ventilation function as needed, thereby improving the comfort and convenience of the backseat passenger 2.

Although the embodiments of the present disclosure have been disclosed for illustrative purposes, those skilled in the art will appreciate that various modifications, additions, and substitutions are possible, without departing from the scope and spirit of the invention as disclosed in the accompanying claims.

What is claimed is:

1. A sliding-type footrest device for a vehicle, comprising:
   a guide rail mounted on a floor panel and extending in a forward-and-backward direction;
   a footrest housing engaged with the guide rail to slide along the guide rail in the forward-and-backward direction, the footrest housing having a door configured to be opened or closed; and
   a footrest box disposed inside the footrest housing and allowing a backseat passenger to place feet into the footrest while the door is open.

2. The sliding-type footrest device according to claim 1, wherein the guide rail extends to a space under a dashboard having a glove compartment, and
   wherein, when the footrest housing slides and reaches a foremost position toward the dashboard, the footrest housing is disposed and covered in the space under the dashboard.

3. The sliding-type footrest device according to claim 1, wherein the door is a single door attached to a rear end portion of the footrest housing and slides vertically upward to open the footrest box.

4. The sliding-type footrest device according to claim 1, wherein the door comprises:
   a first door for opening or closing a rear end portion of the footrest housing; and
   a second door for opening or closing a rear-upper portion of the footrest housing,
   wherein a front end of the second door is rotatably coupled to an upper portion of the footrest housing,
   wherein a rear end of the second door and a front end of the first door are connected to each other rotate relative to each other, and
   wherein, when the rear end of the second door rotates upwards, the first door and the second door are opened by overlapping each other.

5. The sliding-type footrest device according to claim 1,
wherein the door comprises a first door for opening or closing a rear end portion of the footrest housing and a second door for opening or closing a rear-upper portion of the footrest housing,
wherein the first door has a lower end which is rotatably coupled to a rear-lower end of the footrest housing such that an upper end of the first door rotates backwards to be opened, and
wherein the second door has a front end which is rotatably coupled to an upper portion of the footrest housing such that a rear end of the second door rotates upwards to be opened.

6. The sliding-type footrest device according to claim 1, wherein the footrest box comprises:
a foot plate configured to allow a backseat passenger to place feet on the foot plate;
a foot-plate cover for covering the foot plate; and
an elastic band disposed around the foot plate and the foot-plate cover to bind the foot plate and the foot-plate cover to each other, and
wherein the foot-plate cover has an open rear portion.

7. The sliding-type footrest device according to claim 6, wherein the foot plate has a heating wire for a heating function.

8. The sliding-type footrest device according to claim 6, wherein the foot plate has:
a heating wire for a heating function; and
a plurality of air pockets for a massage function.

9. The sliding-type footrest device according to claim 6, wherein the foot plate has a heating wire for a heating function and a plurality of air pockets for a massage function, and
wherein the foot-plate cover is connected with a blower via a duct for a ventilation function.

10. The sliding-type footrest device according to claim 6, wherein a front end of the foot plate and a front end of the foot-plate cover are coupled to each other via a hinge shaft and rotate relative to each other,
wherein a rear end of the foot plate and a rear end of the foot-plate cover are rotatable and move away from each other about the hinge shaft, and
wherein the rear end of the foot plate and the rear end of the foot-plate cover move toward each other by elastic force of the elastic band.

11. The sliding-type footrest device according to claim 5, wherein the footrest housing has a storage container configured to slide vertically along side rails,
wherein the storage container slides vertically while the second door is open, and
wherein, the storage container slides upwards t have a space between the storage container and the footrest housing.

* * * * *